(12) United States Patent
Jones et al.

(10) Patent No.: US 12,196,328 B2
(45) Date of Patent: Jan. 14, 2025

(54) PUSH-BUTTON TUB AND SHOWER DIVERTER

(71) Applicant: Kohler Co., Kohler, WI (US)

(72) Inventors: Tucker A. Jones, Elkhart Lake, WI (US); Brian J. Mooren, Sheboygan Falls, WI (US); Evan S. Yee, Grafton, WI (US); Gregory R. Schmidt, Port Washington, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 18/317,846

(22) Filed: May 15, 2023

(65) Prior Publication Data

US 2023/0279960 A1    Sep. 7, 2023

Related U.S. Application Data

(63) Continuation of application No. 17/508,905, filed on Oct. 22, 2021, now Pat. No. 11,674,607, which is a
(Continued)

(51) Int. Cl.
*F16K 11/22* (2006.01)
*E03C 1/02* (2006.01)

(52) U.S. Cl.
CPC ............... *F16K 11/22* (2013.01); *E03C 1/02* (2013.01)

(58) Field of Classification Search
CPC ................................ F16K 11/22; E03C 1/042
See application file for complete search history.

(56) References Cited

U.S. PATENT DOCUMENTS

| | | |
|---|---|---|
| 4,095,610 A | 6/1978 | Priesmeyer |
| 4,193,553 A | 3/1980 | Kelly et al. |

(Continued)

FOREIGN PATENT DOCUMENTS

| | | |
|---|---|---|
| CN | 104019254 A | 9/2014 |
| EP | 1 277 997 A2 | 1/2003 |

(Continued)

OTHER PUBLICATIONS amazon.com, "Grohe 29138000 29138 Round US Chrome Thm Smartcontrol 3, Starlight Chrome", Internet URL: https://www.amazon.com/GROHE-29138000-Grohtherm-Smartcontrol-Thermostatic/dp/B075F9ZG4M?th=1, dated Nov. 15, 2017 (11 pages).
(Continued)

*Primary Examiner* — Reinaldo Sanchez-Medina
(74) *Attorney, Agent, or Firm* — FOLEY & LARDNER LLP

(57) ABSTRACT

The tub and shower diverter assembly includes an escutcheon, a manifold sub-assembly, and a handle assembly. The manifold sub-assembly is fluidly coupled to an existing waterway connector of an existing conventional tub and shower diverter system. The manifold sub-assembly includes a mixing valve at least partially disposed through the escutcheon and coupled to the manifold sub-assembly by a valve nut. The handle assembly is coaxially aligned with the mixing valve. The handle assembly includes a base insertably coupled to the valve nut and a handle rotatably coupled to the base. The handle is threadably coupled to the mixing valve. The escutcheon abuts a wall when the handle is threadably coupled to the mixing valve.

17 Claims, 8 Drawing Sheets

Related U.S. Application Data continuation of application No. 16/867,664, filed on May 6, 2020, now Pat. No. 11,156,302.

(60) Provisional application No. 62/854,674, filed on May 30, 2019.

(56) References Cited

U.S. PATENT DOCUMENTS

| | | | |
|---|---|---|---|
| 4,241,754 | A | 12/1980 | Moen |
| 4,989,633 | A | 2/1991 | Humpert et al. |
| 5,492,149 | A | 2/1996 | Loschelder et al. |
| 5,546,983 | A | 8/1996 | Clare |
| 6,047,722 | A * | 4/2000 | Cordes ............... F16K 27/045 137/271 |
| 6,453,943 | B1 | 9/2002 | Chang |
| 7,077,150 | B2 | 7/2006 | McNerney |
| 7,296,593 | B2 | 11/2007 | Matsui et al. |
| 8,033,296 | B2 | 10/2011 | Chen |
| 8,235,353 | B2 | 8/2012 | Miyagi et al. |
| 8,312,897 | B2 | 11/2012 | Niver |
| 10,012,320 | B2 | 7/2018 | Cutler et al. |
| 11,674,607 | B2 * | 6/2023 | Jones ............... F16K 11/22 137/15.17 |
| 2011/0126919 | A1 * | 6/2011 | Izzy ............... F16K 19/006 137/606 |
| 2012/0091379 | A1 | 4/2012 | Todman et al. |
| 2015/0308086 | A1 * | 10/2015 | Feng ............... E03C 1/042 4/678 |
| 2016/0340877 | A1 | 11/2016 | Lin et al. |
| 2018/0313066 | A1 | 11/2018 | Ye et al. |
| 2021/0189702 | A1 * | 6/2021 | Li ............... F16K 27/045 |
| 2022/0145597 | A1 * | 5/2022 | Li ............... F16K 27/003 |

FOREIGN PATENT DOCUMENTS

| | | |
|---|---|---|
| EP | 3 263 780 A1 | 1/2018 |
| WO | WO-2018/130708 A1 | 7/2018 |
| WO | WO-2018/130711 A1 | 7/2018 |

OTHER PUBLICATIONS build.com, "Delta Single Handle Shower Valve Trim with Push Button Diverter and Metal Lever Handle from the Commercial Series", Internet URL: https://www.build.com/product/summary/719629?uid=1519755&jmtest=gg-gbav2_1519755&inv2=1&&source=gg-gba-pla_1519755!c1709211103!a69367399080!dc!ng&gclid=EAIaIQobChMirZO8la3R8gIV9Q19Ch0YNgx1EAQYAyABEgLcJvD_BwE&gclsrc=aw.ds, dated Jan. 2013 (2 pages).

build.com, "Grohe Concetto Single Lever Handle Tub and Shower Valve Trim Only Kit With Diverter", Internet URL: https://www.build.com/product/summary/1286502?uid=3057476&jmtest=gg-gbav2_3057476&inv2=1&&source=gg-gba-pla_3057476!c1709211103!a69367399080!dc!ng&gclid=EAIaIQobChMlyL6T38TR8gIV4gutBh0vagJ_EAQYEyABEgLkd_D_BwE&gclsrc=aw.ds, [Retrieved on Sep. 29, 2021 (earliest available date unknown)] (2 pages).

build.com, "Hansgrohe ShowerSelect Thermostatic 2-Function Valve Trim with Shared Outlets—Less Valve", Internet URL: https://www.build.com/hansgrohe-15763/s1152646?uid=2756153, dated Jan. 16, 2014 (6 pages).

ferguson.com, Grohtherm 3-Function Round Tub and Shower Volume Control Valve with Push-Button Handle and Smart Control Round Diverter Trim in Starlight Polished Chrome, Internet URL: https://www.ferguson.com/product/grohe-grohtherm-3-function-round-tub-and-shower-volume-control-valve-with-push-button-handle-and-smart-control-round-diverter-trim-in-starlight-polished-chrome-g29122000/_/R-7346835, dated Nov. 15, 2017 (3 pages).

grainger.com, "Grohe, Triple Function Thermostatic Trim, Chrome", Internet URL: https://www.grainger.com/product/499D36?ef_id=EAIaIQobChMigqLR0Jyf8wIVAfezCh3IPguWEAQYAiABEgKkefD_BwE:G:s&s_kwcid=AL!2966!3!281698275765!!!g!472905489838!&gucid=N:N:PS:Paid:GGL:CSM-2295:4P7A1P:20501231&gclid=EAIaIQobChMigqLR0Jyf8wIVAfezCh3IPguWEAQYAiABEgKkefD_BwE&gclsrc=aw.dshttps://www.grainger.com/ec/pdf/499D36_2.pdf, dated Sep. 28, 2016 (2 pages).

grohe.com, "Rainshower SmartControl", Internet URL: https://www.grohe.us/bathroom/shower-systems/rainshower-smartcontrol?f=computedproductfamilysap%3dRainshower%e2%84%a2SmartControl, [Retrieved on Sep. 29, 2021 (earliest available date unknown)] (8 pages).

grohe.com, "Smart Shower Controller", Internet URL: https://www.grohe.US/bathroom/grohtherm-smartcontrol, dated Nov. 15, 2017 (9 pages).

signaturehardware.com, "Hollyn Simple Select 2-Way Thermostatic Valve—Brushed Nickel", Internet URL: https://www.signaturehardware.com/hollyn-simpleselect-2-way-thermostatic-valve.html?pids=233509, dated Oct. 29, 2020 (3 pages).

signaturehardware.com, "Vilamonte Simple Select Dual Shower Head Shower System", Internet URL: https://www.signaturehardware.com/vilamonte-simple-select-dual-shower-head-shower-system.html, dated Mar. 18, 2021 (4 pages).

* cited by examiner

PUSH-BUTTON TUB AND SHOWER DIVERTER

CROSS-REFERENCE TO RELATED PATENT APPLICATIONS

This application is a Continuation of U.S. patent application Ser. No. 17/508,905, filed Oct. 22, 2021, which is a Continuation of U.S. patent application Ser. No. 16/867,664, filed May 6, 2020, which claims priority from U.S. Provisional Patent Application No. 62/854,674, filed May 30, 2019. The entire disclosures of U.S. patent application Ser. No. 17/508,905, U.S. patent application Ser. No. 16/867,664, and U.S. Provisional Patent Application No. 62/854,674 are hereby incorporated by reference herein.

BACKGROUND

The present disclosure relates generally to a tub and shower diverter. More specifically, the present disclosure relates to a tub and shower diverter including push-button actuators.

SUMMARY OF THE INVENTION

At least one embodiment relates to a tub and shower diverter assembly. The tub and shower diverter assembly includes an escutcheon, a manifold sub-assembly, and a handle assembly. The manifold sub-assembly is fluidly coupled to an existing waterway connector of an existing conventional tub and shower diverter system. The manifold sub-assembly includes a mixing valve at least partially disposed through the escutcheon and coupled to the manifold sub-assembly by a valve nut. The handle assembly is coaxially aligned with the mixing valve. The handle assembly includes a base insertably coupled to the valve nut and a handle rotatably coupled to the base. The handle is threadably coupled to the mixing valve. The escutcheon abuts a wall when the handle is threadably coupled to the mixing valve.

Another embodiment relates to a tub and shower diverter assembly. The tub and shower diverter assembly includes an escutcheon, a manifold sub-assembly, and a handle assembly. The escutcheon includes a first push button and a second push button positioned opposite the first push button. The first push button and the second push button extend through the escutcheon and protrude outward from the escutcheon. The manifold sub-assembly includes a manifold and a mixing valve. The manifold includes an inlet/outlet portion received in an existing waterway connector and an opening positioned opposite the inlet/outlet portion. The mixing valve is at least partially disposed through the opening. The handle assembly is coupled to the manifold sub-assembly. The handle assembly includes a base at least partially received within the escutcheon and a handle threadably coupled to the mixing valve. The escutcheon abuts a wall when the handle is threadably coupled to the mixing valve. An axial position of the escutcheon, in relation to the manifold sub-assembly, is adjustable.

Another embodiment relates to a manifold sub-assembly for a tub and shower diverter system. The manifold sub-assembly includes a manifold, a first push button assembly, and a second push button assembly. The first push assembly is configured to direct water in a first direction and coupled to a first side of the manifold. The first push button includes a first flow control valve and a first tolerance adjustor. The first flow control valve is configured to provide a flow of water to one of a tub or a shower device. The first tolerance adjustor is coupled to an end of the first flow control valve and configured to transmit an axial force within the first push button assembly. The second push button assembly is configured to direct water in a second direction and coupled to a second side of the manifold. The second push button assembly includes a second flow control valve and a second tolerance adjustor. The second push button assembly includes a second flow control valve configured to provide a flow of water to the other of the tub or the shower device. The second tolerance adjustor is coupled to an end of the second flow control valve and configured to transmit an axial force within the second push button assembly.

This summary is illustrative only and is not intended to be limiting in anyway.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
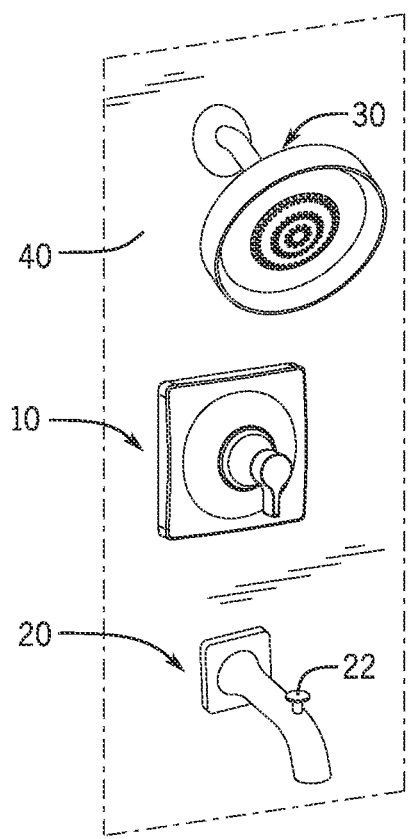
FIG. 1 illustrates a shower environment including a tub spout and shower diverter according to the prior art.

Generally speaking, most conventional tub and shower diverters require a user to manually rotate a handle or other actuator to start a flow of water. For example, referring to FIG. 1, a user may manually rotate a handle assembly 10 to start a flow of water in a conventional tub and shower diverter system. The flow of water typically flows through a tub spout 20 as the primary outlet in the system. If a user wishes to divert the flow of water to, for example, an overhead shower 30, the user must manually lift a diverter pin 22 located on the tub spout 20 to redirect the flow of water to the shower 30, which can be difficult or uncomfortable for a user to perform.

Referring generally to FIGS. 2-14, disclosed herein is a push-button tub and shower diverter assembly 100 that allows a user to set an approximate water temperature range by turning a handle 108 to start a flow of water, and then selectively actuate one of a first push button 104 associated with the shower 30 to divert the flow of water to the shower or a second push button 106 associated with a tub spout 20' to divert the flow of water to the tub. The first and second push buttons 104,106 are each operatively coupled to separate flow control valves located in close proximity to each other. The system further includes a mixing valve 122 (e.g., a sequential valve, etc.) that is operatively coupled to the handle 108 to control the water temperature for both the shower 30 and the tub spout 20' in the same general location. The first push button 104 and the second push button 106 may be located in the same approximate area as the flow control handle 108, such as on the same trim piece or escutcheon 102, so as to help avoid the need for a user to have to bend over to manually pull a diverter pin on the tub spout (e.g., diverter pin 22, etc.) to divert the flow, as is the case with most conventional tub and shower diverters.

In addition, the disclosed diverter assembly may be configured as a retrofit assembly to replace an existing, conventional tub and shower diverter without having to remove or replace the existing waterway connector (e.g., hot and cold water supply connections, tub spout and shower connections, etc.). According to an exemplary embodiment, the assembly includes a manifold sub-assembly that is configured to be detachably coupled to an existing waterway connector (e.g., valve body, etc.) of a conventional tub and shower diverter system. The manifold sub-assembly may include the mixing valve, the separate flow control valves, and a tolerance adjustor coupled to each of the flow control valves. The tolerance adjustors can be selectively adjusted by hand without a tool (e.g., pliers, etc.) to compensate for different spacing between the flow control valves and the push buttons that are located externally on an adjacent wall, which may result from different installation depths of the waterway connector and/or variations in thickness of the adjacent wall, depending on the installation environment.

Figure 2:
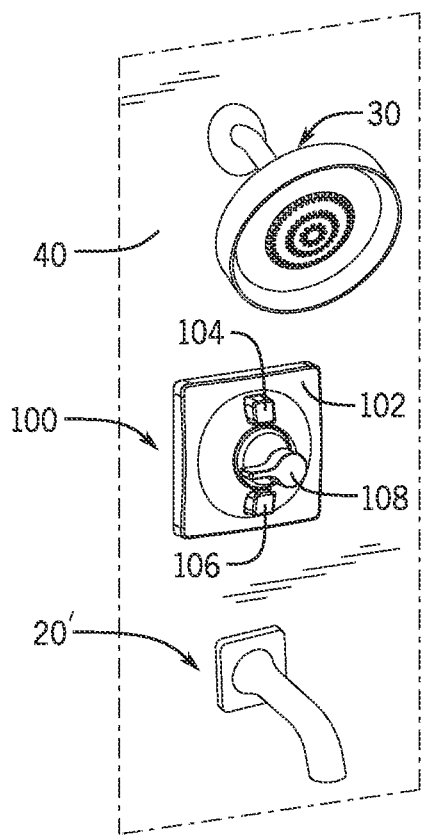
FIG. 2 illustrates a shower environment including a tub spout and shower diverter according to an exemplary embodiment of the present disclosure.
Figure 3:
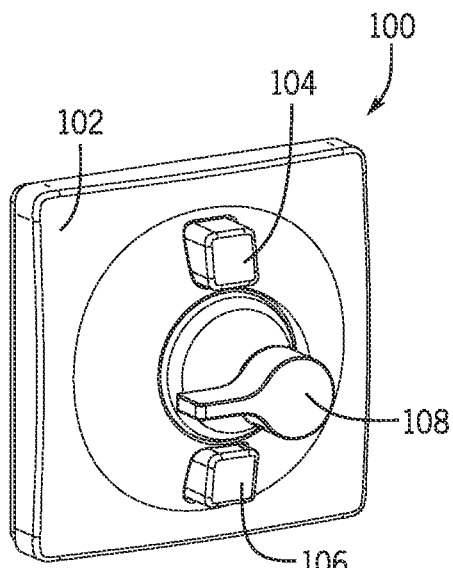
FIG. 3 is a perspective view of a tub and shower diverter assembly according to an exemplary embodiment.
Figure 4:
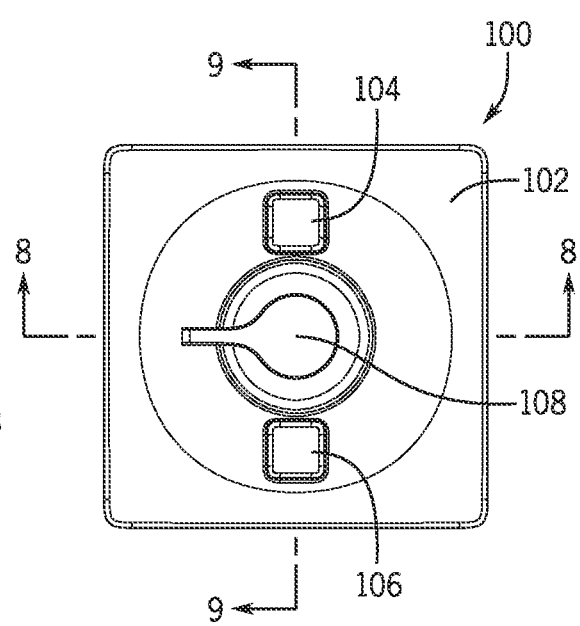
FIG. 4 is a front view of the diverter assembly of FIG. 3.

Referring to FIGS. 2-7, a diverter assembly 100 is shown according to an exemplary embodiment. FIGS. 2-4 are external views of the diverter assembly 100 when installed to, for example, an outer facing surface of a shower wall 40. As shown in FIGS. 2-4, the diverter assembly 100 includes an escutcheon 102 (e.g., decorative trim, etc.) configured to engage a fixed structure of a building, such as the shower wall 40. The escutcheon 102 includes a first push button assembly 104 and a second push button assembly 106. The first push button assembly 104 may be associated with a first valve 114a for controlling water flow to one of a tub spout (e.g., tub spout 20', etc.) or a shower (e.g., shower 30, etc.) and the second push button assembly 106 may be associated with a second valve 114b for controlling water flow to the other of the tub spout or shower. The first push button assembly 104 and the second push button assembly 106 are each configured to be independently actuated by a user to selectively control water flow to the tub spout or the shower, respectively. The diverter assembly 100 further includes a handle assembly 108 for selectively controlling the water temperature of a flow of water from a water source (e.g., a household hot and cold water supply, etc.) to the first valve 114a and the second valve 114b, the details of which are discussed below.

Figure 5:
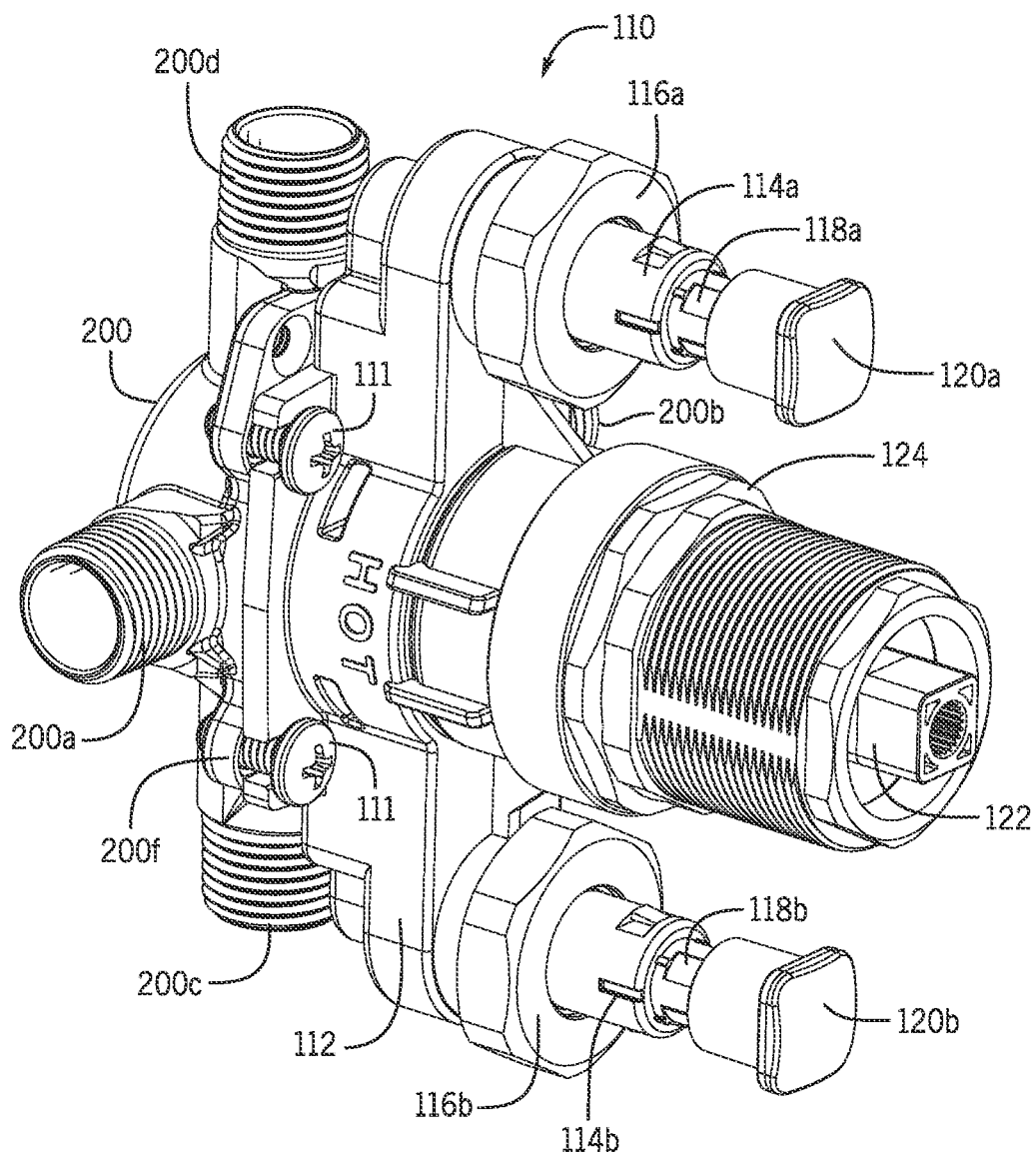
FIG. 5 is a perspective view of a manifold sub-assembly according to an exemplary embodiment.
Figure 6:
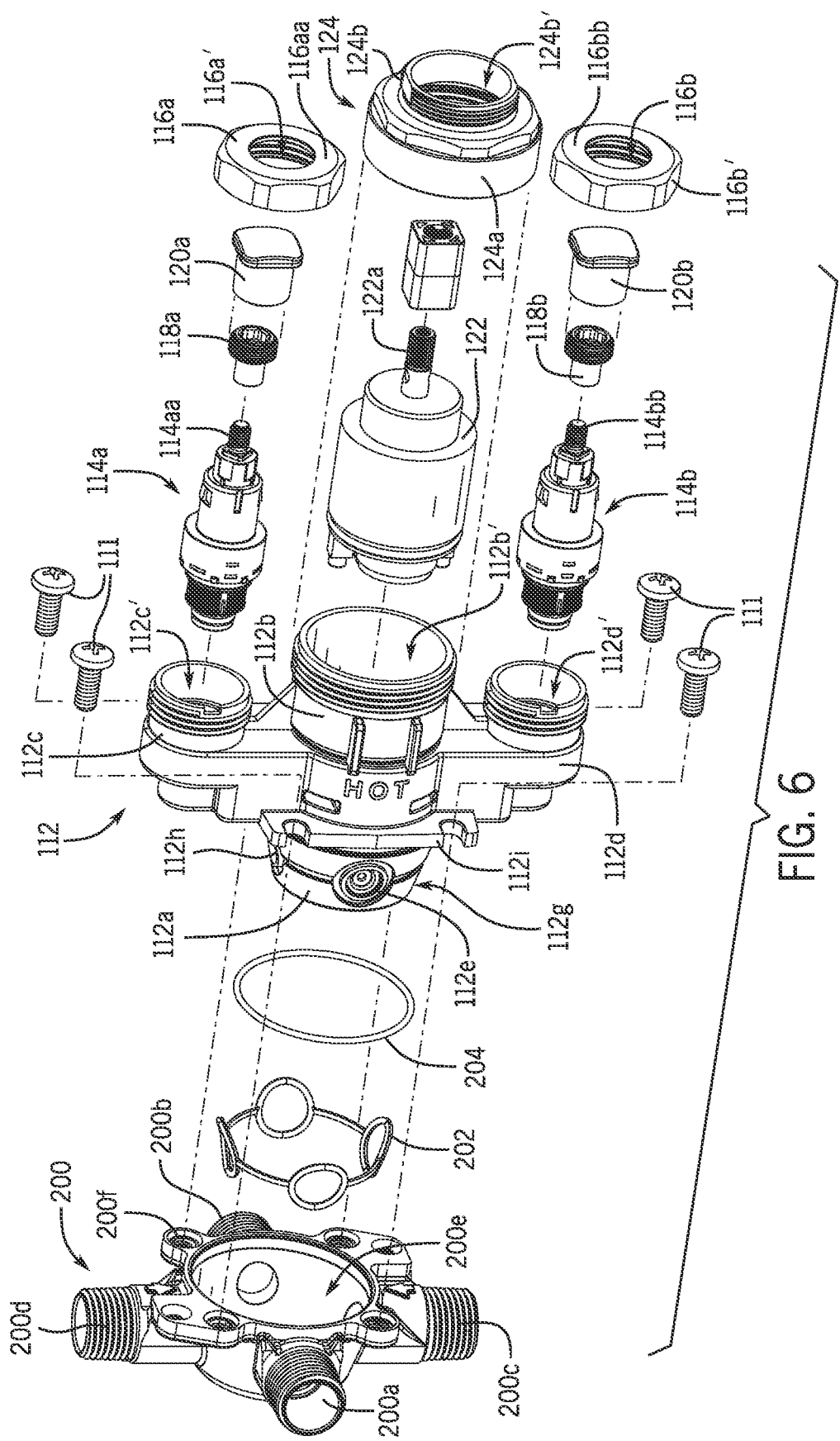
FIG. 6 is an exploded view of the manifold sub-assembly of FIG. 5.

Referring to FIGS. 5-6, the diverter assembly 100 further includes a manifold sub-assembly 110 configured to be detachably coupled to a waterway connector 200 (e.g., valve body, etc.) at a flange 200f. The waterway connector 200 includes a plurality of inlets that are configured to receive water from hot/cold water supplies, and to direct the received water to the manifold sub-assembly 110. The waterway connector 200 further includes a plurality of outlet conduits for distributing water from the manifold sub-assembly 110 to a tub spout or a shower. According to the exemplary embodiment shown, the waterway connector 200 is an existing waterway connector of a traditional tub and shower diverter system, and the manifold sub-assembly 110 is configured to be retrofitted to the waterway connector 200 in place of a conventional manifold, the details of which are discussed below with respect to FIGS. 11-14. According to another exemplary embodiment, the diverter assembly 100 comprises both the manifold sub-assembly 110 and the waterway connector 200 for installation as a complete unit.

As shown in FIGS. 5-6, the waterway connector 200 includes a first inlet 200a, a second inlet 200b located opposite the first inlet 200a, a first outlet 200c, and a second outlet 200d located opposite the first outlet 200c. The first inlet 200a, the second inlet 200b, the first outlet 200c, and the second outlet 200d are each fluidly coupled to a central opening 200e. In the embodiment shown, the first inlet 200a and the second inlet 200b are oriented laterally across from each other in opposite directions. The first outlet 200c and the second outlet 200d are oriented longitudinally across from each other in opposite directions. In this way, the waterway connector 200 has a generally cross-shaped configuration. The first inlet 200a is configured to be in fluid communication with one of a hot water supply or a cold water supply of the water source, and the second inlet 200b is configured to be in fluid communication with the other of the hot water supply or the cold water supply. The first outlet 200c is configured to be in fluid communication with a tub spout (e.g., tub spout 20', etc.), which is typically located below the installation position of the waterway connector 200 in a shower/bath environment (see, for example, FIG. 2), and the second outlet 200d is configured to be in fluid communication with a shower (e.g., shower 30, etc.), which is typically located above the installation position of the waterway connector 200, hence the opposing longitudinal orientation of the first outlet 200c and the second outlet 200d. The central opening 200e can receive a portion of the manifold sub-assembly 110 therein, so as to direct water from the hot water supply and/or the cold water supply to the manifold sub-assembly 110.

Still referring to FIGS. 5-6, the manifold sub-assembly 110 includes a manifold 112 detachably coupled to the waterway connector 200 via one or more fasteners 111 at the flange 200f. The first valve 114a is coupled to the manifold 112 by a first nut 116a. Likewise, the second valve 114b is coupled to the manifold 112 by a second nut 116b. As shown, the first valve 114a is located longitudinally across from the second valve 114b on the manifold 112. A first tolerance adjustor, cooperatively defined by a first adapter 118a and a first extension 120a, is coupled to an end portion of the first valve 114a. Likewise, a second tolerance adjustor, cooperatively defined by a second adapter 118b and a second extension 120b, is coupled to an end portion of the second valve 114b. The first extension 120a is configured to abut the first push button assembly 104 and the second extension 120b is configured to abut the second push button assembly 106, so as to transmit an axial force from the push button assemblies 104,106 to the respective first and second valves 114a,114b. The first and second extensions 120a,120b are each configured to be selectively adjusted by hand, without a tool (e.g., pliers, etc.), relative to the respective first and second adapters 118a,118b to compensate for any variations in axial distance between the first and second extensions 120a,120b and the first and second button assemblies 104, 106 when the diverter assembly 100 is installed in a shower environment, the details of which are discussed in the paragraphs that follow.

The manifold sub-assembly 110 further includes a mixing valve 122 coupled to the manifold 112 by a valve nut 124. According to an exemplary embodiment, the mixing valve 122 is a sequential mixing valve that controls water temperature and flow to each of the first valve 114a and the second valve 114b (i.e., a mixing valve that operates from cold to hot in a sequential movement). According to other exemplary embodiments, the mixing valve 122 may be any other type of mixing valve capable of controlling water temperature from a hot and a cold water supply.

Still referring to FIGS. 5-6, the manifold 112 includes an inlet/outlet portion 112a configured to be received in the central opening 200e of the waterway connector 200 to fluidly couple the manifold 112 to the waterway connector 200. The inlet/outlet portion 112a has a generally frusto-conical shape that is complementary to the central opening 200e of the waterway connector 200. The inlet/outlet portion 112a includes a first inlet port 112e configured to be fluidly coupled to the first inlet 200a, a second inlet port 112f configured to be fluidly coupled to the second inlet 200b, a first outlet port 112g configured to be fluidly coupled to the first outlet 200c, and a second outlet port 112h configured to be fluidly coupled to the second outlet 200d. The manifold 112 may include one or more sealing members 202,204 to sealingly engage the waterway connector 200, so as to create a substantially watertight seal therebetween.

Still referring to FIGS. 5-6, the manifold 112 further includes a mixing portion 112b located opposite the inlet/outlet portion 112a that defines an opening 112b' for receiving at least a portion of the mixing valve 122 therein. The manifold 112 further includes a first valve housing 112c and a second valve housing 112d located opposite the first valve housing 112c. The first valve housing 112c and the second valve housing 112d each extend radially outwardly from the mixing portion 112b. The first valve housing 112c and the second valve housing 112d are each fluidly coupled to the mixing portion 112b. The first valve housing 112c defines a first opening 112c' for receiving at least a portion of the first valve 114a therein. Likewise, the second valve housing 112d defines a second opening 112d' for receiving at least a portion of the second valve 114b therein. The manifold 112 also includes a mounting flange 112i for detachably coupling the manifold 112 to a corresponding flange 200f of the waterway connector 200 using one or more fasteners 111 (e.g., screws, etc.), which may be existing fasteners that were used to couple a conventional manifold to the waterway connector 200 in a retrofit scenario. According to other exemplary embodiments, the manifold 112 may be detachably coupled to the waterway connector 200 using other fastening arrangements, such as snap features, bayonet features, etc.

Figure 7:
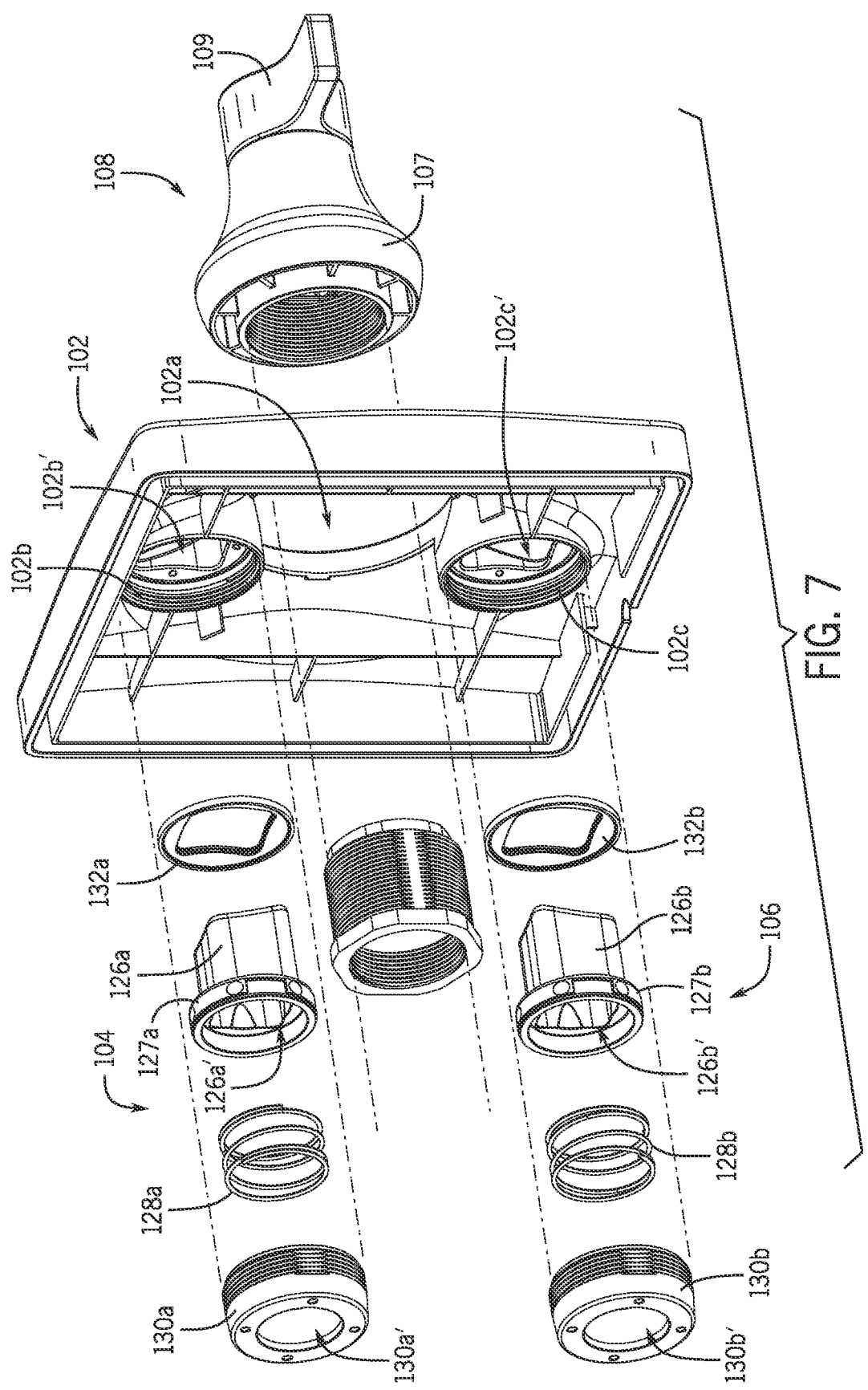
FIG. 7 is an exploded view of a portion of the diverter assembly of FIG. 3.

Referring to FIGS. 5-7, the first valve 114a and the second valve 114b are each configured as push-button style, on/off flow control valves. At least a portion of the first valve 114a is received in the first opening 112c' and at least a portion of the second valve 114b is received in the second opening 112d'. The first valve 114a is detachably coupled to the manifold 112 by a first nut 116a. Likewise, the second valve 114b is detachably coupled to the manifold 112 by a second nut 116b. For example, the first nut 116a includes a flange 116aa and an opening 116a'. A portion of the first valve 114a is received through the first opening 116a', and the flange 116aa is configured to engage the first valve 114a to retain the first valve 114a in the manifold 112. The first nut 116a is configured to be adjustably coupled to the manifold 112 at the first valve housing 112c by a threaded interface between the first nut 116a and a portion of the manifold 112, so as to sandwich the first valve 114a between the first nut 116a and the manifold 112. The second valve 114b and the second nut 116b are configured the same as the first valve 114a and the first nut 116a, respectively. Accordingly, for the sake of brevity, the above description of the first valve 114a and the first nut 116a also applies to the second valve 114b and the second nut 116b.

As shown in FIGS. 5-6, the first tolerance adjustor, which is cooperatively defined by the first adapter 118a and the first extension 120a, is adjustably coupled to a stem 114aa of the first valve 114a. Likewise, the second tolerance adjustor, which is cooperatively defined by the second adapter 118b and the second extension 120b, is adjustably coupled to a stem 114bb of the second valve 114b. The first and second extensions 120a,120b are each configured to abut a respective one of the first and second push button assemblies 104,106 to transmit an axial force from a user to the first and second valves 114a,114b, respectively, so as to actuate the valves to divert a flow of water between a tub spout and a shower. The first and second adapters 118a,118b adjustably couple the first and second extensions 120a,120b to the first and second valves 114a,114b, respectively. In particular, the first and second extensions 120a,120b are threadably coupled to a portion of the first and second adapters 118a, 118b, respectively. A user or an installer may selectively adjust an axial position of the first and second extensions 120a,120b relative to the first and second valves 114a,114b by manually rotating the first and second extensions 120a, 120b, respectively. In this way, the first and second tolerance adjustors allow for the selective adjustment of the relative axial spacing between the push button assemblies 104,106 and the first and second valves 114a,114b, so as to account for variations in wall thickness or installation depths of the diverter assembly at different installation sites, the details of which are discussed below with reference to FIGS. 10-13.

Referring to FIGS. 5-6 and 8-9, the mixing valve 122 is coupled to the manifold 112 at the mixing portion 112b by the valve nut 124. The valve nut 124 includes a first portion 124a for detachably coupling to the mixing portion 112b (e.g., via a threaded interface, etc.). The valve nut 124 also includes a second portion 124b extending from the first portion 124a. The second portion 124b defines an opening 124b' for receiving a portion of the mixing valve 122 therethrough, such as a valve stem 122a. The second portion 124b includes an attachment interface, shown as threads, for detachably coupling a handle assembly 108, the details of which are discussed below with respect to FIG. 7.

Figure 8:
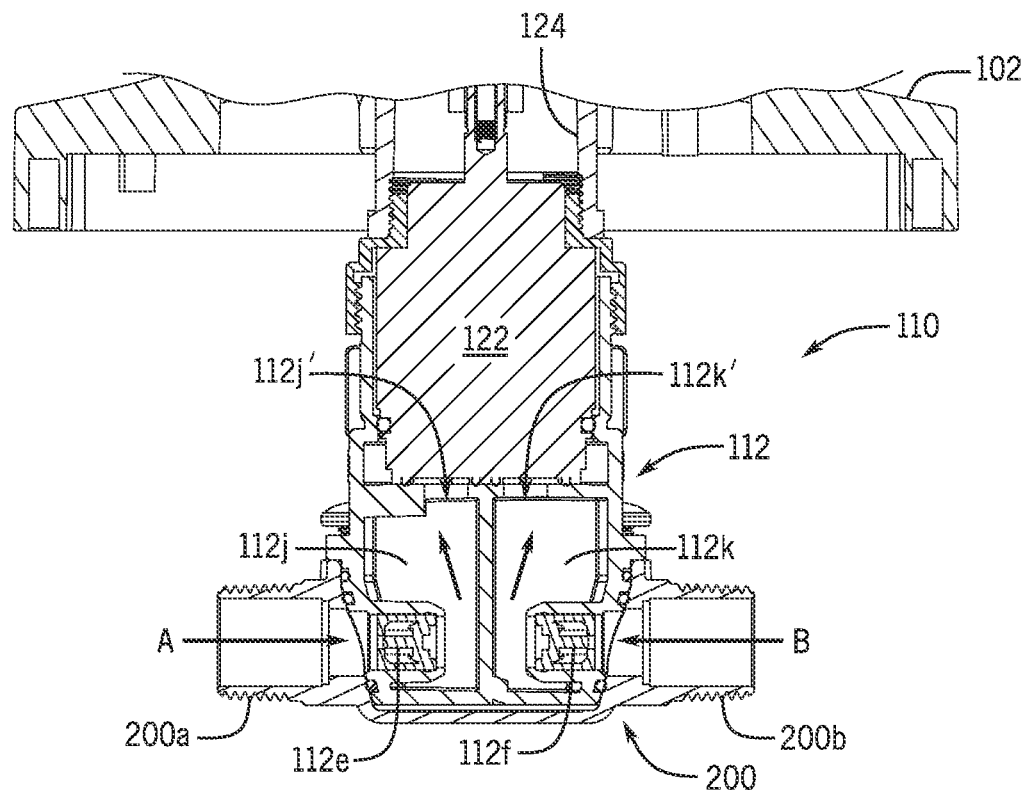
FIG. 8 is a cross-sectional view of the diverter assembly of FIG. 4 taken along line 8-8.

As shown in FIGS. 5-6 and 8-9, the mixing valve 122 is at least partially disposed in the opening 112b' of the mixing portion 112, such that the mixing valve 122 is in fluid communication with the hot and cold water sources. For example, as shown in FIG. 8, the mixing portion 112b includes a first chamber 112j that is in fluid communication with the mixing valve 122 by a first valve port 112j'. The first chamber 112j is also in fluid communication with the first inlet port 122e, which is fluidly coupled to the first inlet 200a. In the exemplary embodiment shown in FIG. 8, the first inlet 200a is configured to receive a flow of water from a water source, shown as a hot water source "A", so as to direct the flow of water to the mixing valve 122 via the first chamber 112j and the first valve port 112j'. Similarly, the mixing portion 112b includes a second chamber 112k that is in fluid communication with the mixing valve 122 by a second valve port 112k'. The second chamber 112k is also in fluid with the second inlet port 122f, which is fluidly coupled to the second inlet 200b. In the exemplary embodiment shown in FIG. 8, the second inlet 200b is configured to receive a flow of water from a water source shown as a cold water source "B," so as to direct the flow of water to the mixing valve 122 via the second chamber 112k and the second valve portion 112k'.

Figure 9:
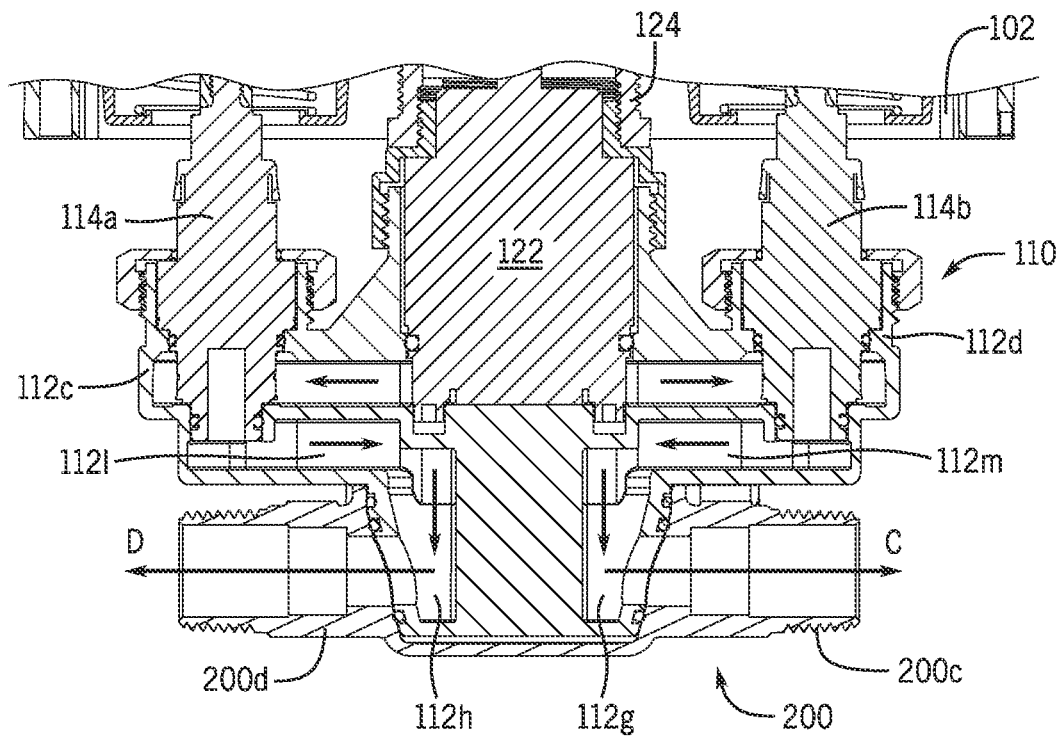
FIG. 9 is a cross-sectional view of the diverter assembly of FIG. 4 taken along line 9-9.

As shown in FIG. 9, the mixing valve 122 can direct a mixed flow of water from the hot and cold water sources through the mixing portion 122b to the first valve housing 112c and the second valve housing 112d of the manifold 112. In response to actuation of the first valve 114a, the mixed flow of water received at the first valve housing 112c is directed to a third chamber 112l of the manifold 112, which is in fluid communication with the second outlet port 112g and the second outlet 200d, so as to direct the mixed flow of water in a direction indicated generally by arrow "D" toward the shower. Similarly, in response to actuation of the second valve 114b, the mixed flow of water received at the second valve housing 112d is directed to a fourth chamber 112m of the manifold 112, which is in fluid communication with the first outlet port 112g and the first outlet 200c, so as to direct the mixed flow of water in a direction indicated generally by arrow "C" toward the tub spout.

Referring to FIG. 7, the diverter assembly 100 further includes an escutcheon 102 (e.g., trim piece, etc.) for retaining the first and second push button assemblies 104,106 and for providing an external user interface on, for example, a wall in a shower environment (e.g., shower wall 40, etc.). The escutcheon 102 includes a central opening 102a for receiving at least a portion of the handle assembly 108 therethrough. As shown in FIG. 7, the handle assembly 108 is collectively defined by a base 107 and a handle 109. The handle assembly 108 is configured to be detachably coupled to the first portion 124a of the valve nut 124, so as to rotatably couple the handle assembly 108 to the mixing valve 122 to allow for a user to manually operate the mixing valve 122 to control water temperature.

Still referring to FIG. 7, the escutcheon 102 further includes a first sleeve 102b and a second sleeve 102c located opposite the first sleeve 102b. The first sleeve 102b defines an opening 102b' extending therethrough for receiving at least a portion of a first button member 126a. The first sleeve 102b further includes attachment features on an inner surface thereof for detachably coupling a retainer 130a to the escutcheon 102. According to the exemplary embodiment shown, the attachment features are threads, although the attachment features may be configured as twist-and-lock features, bayonet features, or other attachment features according to other exemplary embodiments. In the embodiment shown, the second sleeve 102c has the same configuration as the first sleeve 102b. Accordingly, for the sake of brevity, the above details regarding the first sleeve 102b also apply to the second sleeve 102c.

Figure 10:
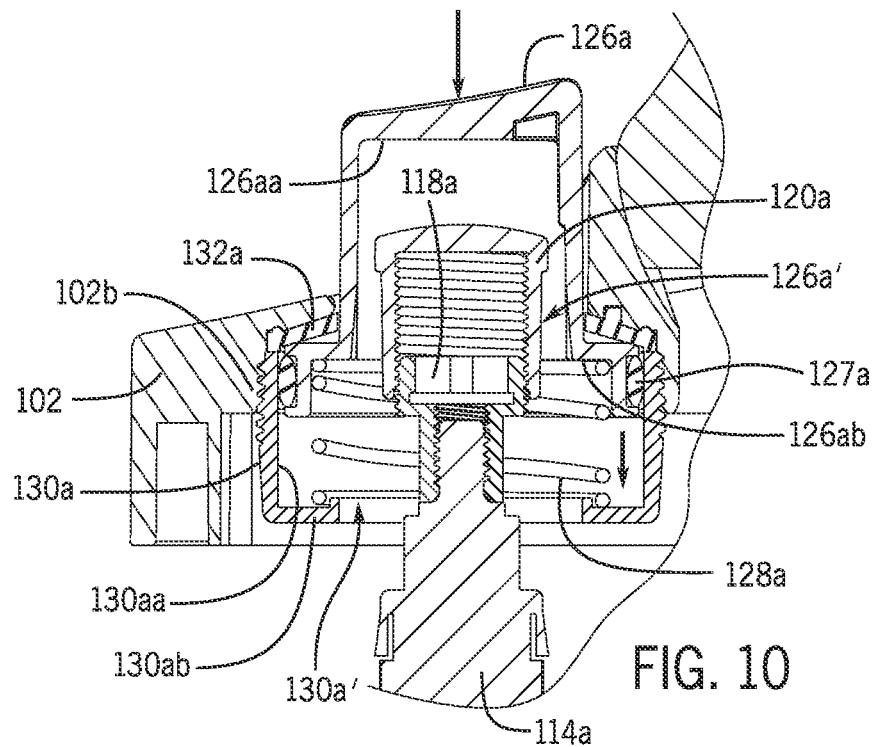
FIG. 10 is a partial cross-sectional view of the diverter assembly of FIG. 4.

Referring to FIGS. 7 and 10, the first push button assembly 104 includes a first button member 126a. The first button member 126a defines a cavity 126a' (e.g., opening, hollow portion, etc.) for receiving at least a portion of the first extension 120a. The first button member 126a includes an inner surface 126aa for engaging the first extension 120a, so as to transmit an axial force to the first valve 114a from an outer surface of the first button member 126a, such as when a user wishes to divert a flow of water to, for example, a shower (represented by a block arrow in FIG. 10). The first button member 126a further includes an inner ledge 126ab (e.g., step, flange, etc.) for engaging a biasing member 128a (e.g., spring, etc.) disposed at least partially in the cavity 126a', so as to provide a return force of the button member 126a upon actuation, and to provide a particular tactile response to a user. The first button member 126a further includes a sealing member 127a coupled to, or integrally formed with, a periphery of the button member 126a. The sealing member 127a can also help to provide a tactile response to a user upon actuating the first button member 126a.

Still referring to FIGS. 7 and 10, the first push button assembly 104 further includes a retainer 130a (e.g., retaining member, etc.). The retainer 130a is detachably coupled to the sleeve 102b (e.g., by a plurality of threads, etc.), and is configured to house or retain a first biasing member, shown as a first spring 128a, therein. The retainer 130a includes a button engagement surface 130aa for slidably engaging the sealing member 127a and/or a portion of the first button member 126a, so as to enable axial movement of the first button member 126a relative to the escutcheon 102. The retainer 130a further includes an inner lip 130ab extending inward from the engagement surface 130aa toward a center of the retainer 130a. The inner lip 130ab is configured to retain an end portion of the first spring 128a relative to the retainer 130a. The inner lip 130ab defines an opening 130a' extending through the retainer 130a for receiving the first extension 120a therethrough during assembly of the escutcheon 102 to the manifold sub-assembly 110, and to enable relative movement of the first extension 120a, the first adapter 118a, and the first valve 114a during actuation of the first button member 126a.

As shown in FIGS. 7 and 10, the first spring 128a is disposed between the inner ledge 126ab of the first button member 126a and the inner lip 130ab of the first retainer 130a. The first spring 128a is configured to bias the first button member 126a against a first gasket 132a and a portion of the escutcheon 102. The first spring 128a can provide a particular actuation and return force of the first button member 126a. The first gasket 132a can help to absorb impact of the first button member 126a when the first button member 126a is biased by the first spring 128a against the escutcheon 102.

Still referring to FIGS. 7 and 10, the second push button assembly 106 is configured the same as the first push button assembly 104. Accordingly, for the sake of brevity, the above description of the various elements and features of the first push button assembly 104 also apply to the same elements and features of the second push button assembly 106, which are designated by the same reference numerals including a "b" designation instead of an "a" (e.g., the second button member 126b includes the same features as the first button member 126a, etc.). As shown in FIGS. 7 and 10, the first and second push button assemblies 104,106 are coupled to the escutcheon 102, so as to define a sub-assembly that can be coupled directly to the manifold sub-assembly 110, the details of which are discussed in the paragraphs that follow.

Figure 11:
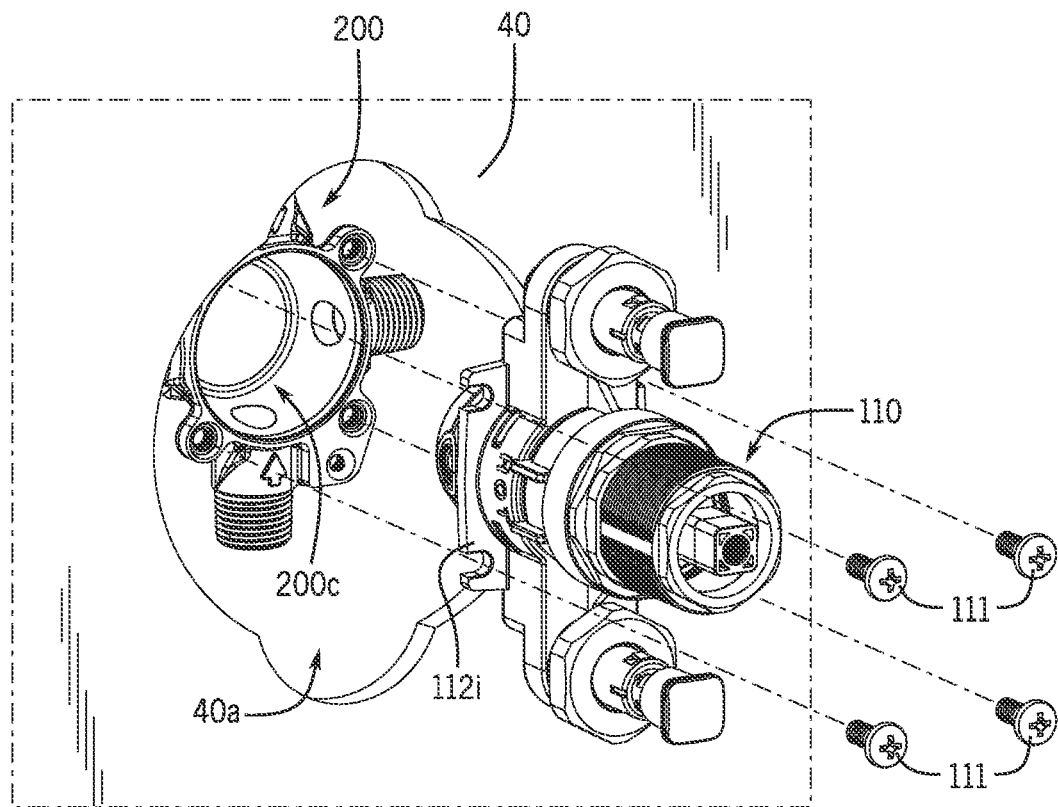
FIGS. 11-13 are perspective views illustrating an installation sequence of the diverter assembly of FIG. 4 in a shower environment.

Referring to FIGS. 11-14, a method 300 of retrofitting a push-button diverter assembly in a conventional tub and shower diverter system is shown according to an exemplary embodiment. In a first step 310 shown in FIG. 14, an existing, conventional tub and shower diverter manifold is removed from a waterway connector 200 through an opening in a wall (e.g., opening 40a in wall 40 shown in FIG. 11, etc.). In a second step 320, the manifold sub-assembly 110 of the present disclosure is coupled to the waterway connector 200. For example, as shown in FIG. 11, fasteners 111 are removed from the existing waterway connector 200, such that the manifold 112 can be at least partially inserted into the central opening 200e of the waterway connector 200 with the respective ports and inlets/outlets aligned. The mounting flange 112i can then be aligned with the corresponding flange 200f on the waterway connector 200, and the fasteners 111 can be reinstalled to couple the mounting flange 112i to the flange 200f.

Figure 12:
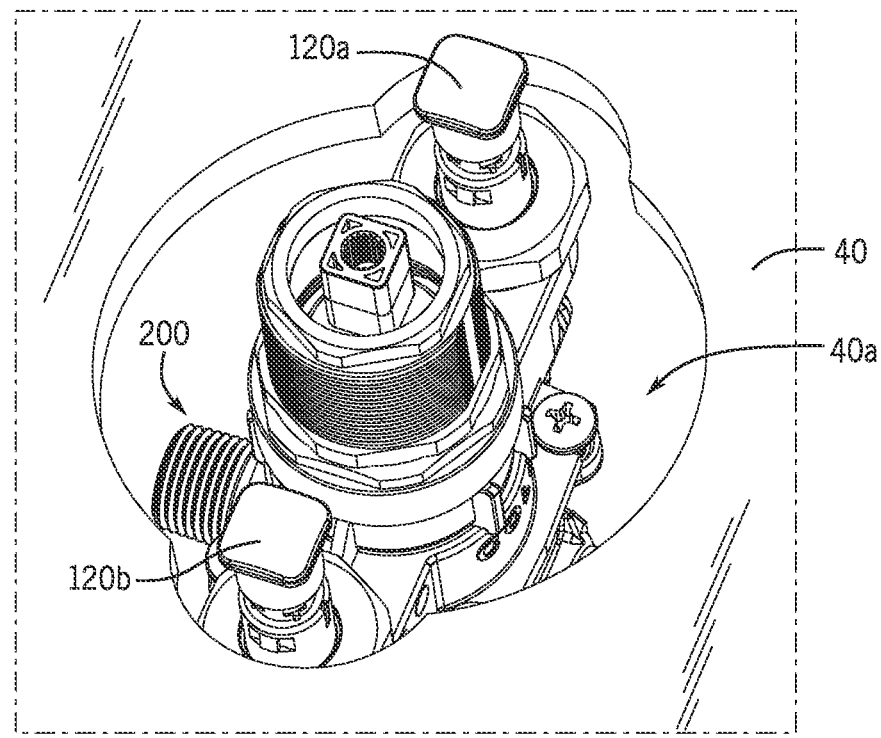

In a third step 330, at least one of the first extension 120a or the second extension 120b can be selectively adjusted relative to the manifold sub-assembly 110, so as to properly abut the first push button assembly 104 and the second push button assembly 106, respectively. For example, as shown in FIG. 12, a user or an installer may determine the correct distance that the first and second extensions 120a,120b need to extend past an outer facing surface of the shower wall 40, so as to properly abut the first and second push button assemblies 104,106 when the escutcheon 102 is coupled to the manifold sub-assembly 110. The user or the installer may then selectively adjust the first and second extensions 120a, 120b by rotating the extensions relative to the first and second valves 114a,114b, respectively, such that the extensions translate axially toward or away from the shower wall 40. In this manner, the first and second extensions 120a,120b can account for variations in wall thickness and spacing depending on the installation environment.

Figure 13:
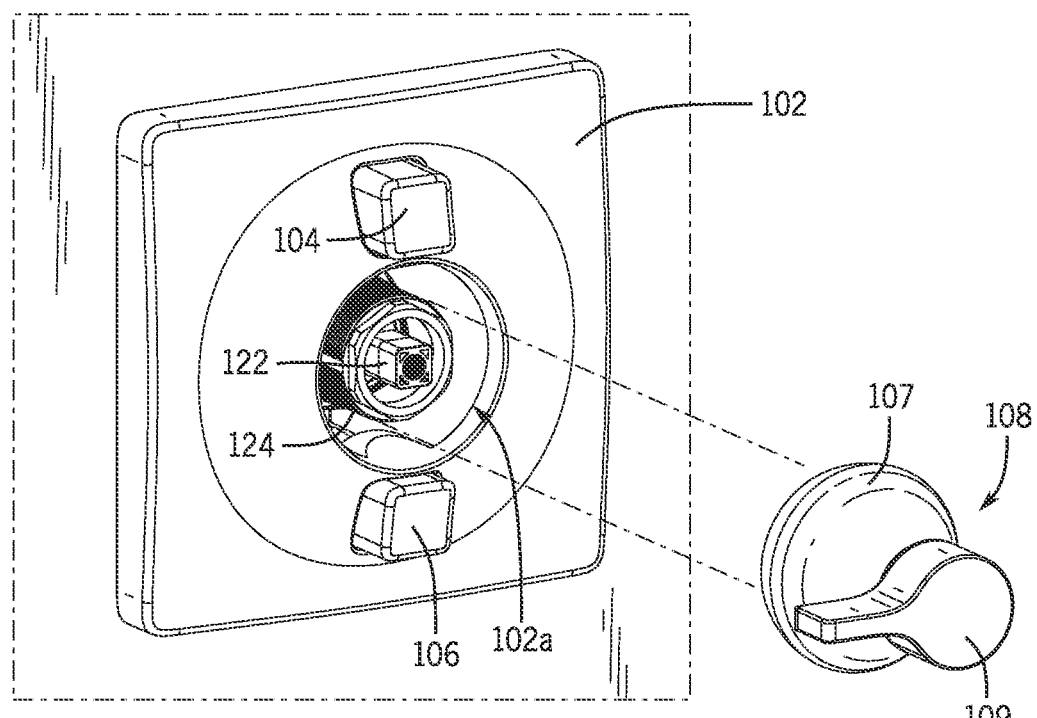
Figure 14:
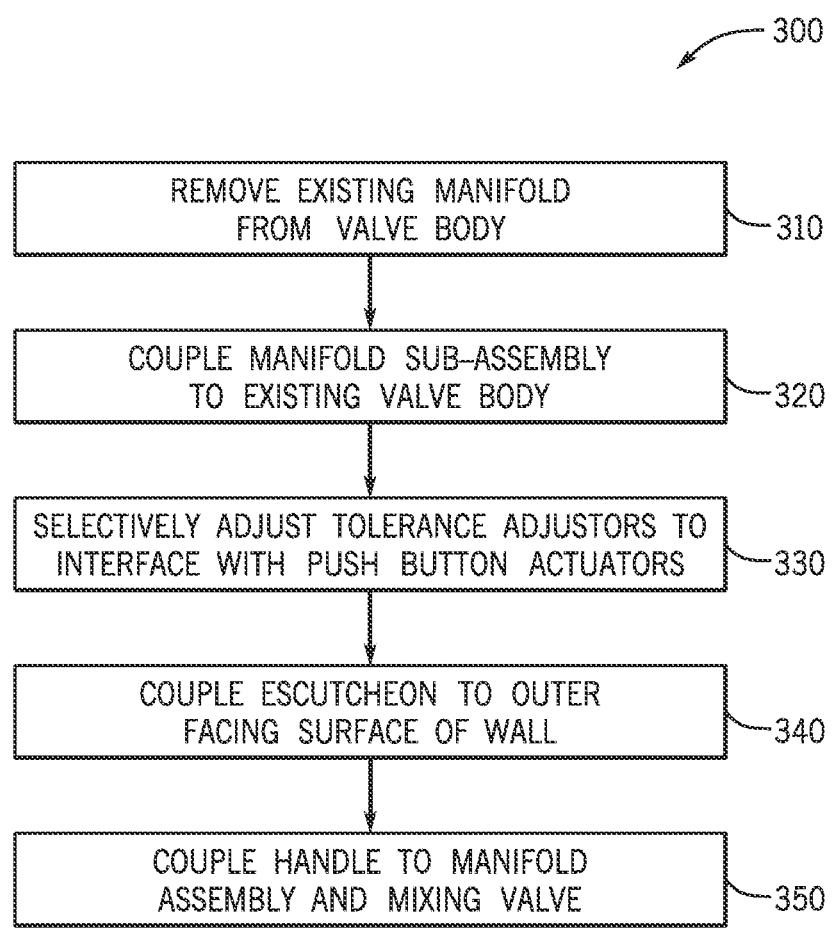
FIG. 14 is a flow diagram illustrating a method of retrofitting a tub and shower diverter assembly in a shower environment according to an exemplary embodiment.

In a fourth step 340, the escutcheon 102 is coupled to the manifold sub-assembly 110 and to the outer facing surface of a fixed structure (e.g., shower wall 40, etc.). For example, as shown in FIG. 13, the escutcheon 102 including the first and second push button assemblies 104,106, is coupled to the manifold sub-assembly 110. The first button member 126a abuts with the first extension 120a and the second button member 126b abuts with the second extension 120b, with the escutcheon 102 placed flush against the outer facing surface of the shower wall 40.

In a fifth step 350, the handle assembly 108 is coupled to the manifold sub-assembly 110 through the escutcheon 102. For example, as shown in FIG. 13, the handle assembly 108 is shown inserted through the opening 102a of the escutcheon 102, such that the base 107 couples to the valve nut 124 and the handle 109 couples to the mixing valve 122. In this manner, the manifold sub-assembly 110 and the escutcheon 102 can, advantageously, allow for retrofitting a conventional tub and shower diverter system with a push-button style diverter assembly.

An exemplary operational sequence of the diverter assembly 100 will now be described with reference to FIGS. 2-10. A user may initiate a flow of water from a water source by rotating the handle assembly 108. If the user wishes to discharge water from the shower 30, the user may selectively actuate the first push button assembly 104 by applying a pressing force to the first button member 126a. The first button member 126a will transfer the applied force to the first extension 120a, thereby actuating the first valve 114a. The first valve 114a will then permit water to flow through the third chamber 112l of the manifold 112 to the second outlet port 112h and the second outlet 200d, where the water can be discharged by the shower 30.

If a user wishes to discharge water from the tub spout 20', the user may selectively actuate the second push button assembly 106 by applying a pressing force to the second button member 126b. The second button member 126b will transfer the applied force to the second extension 120b, thereby actuating the second valve 114b. The second valve 114b will then permit water to flow through the fourth chamber 112m of the manifold 112 to the first outlet port 112g and the first outlet 200c, where the water can be discharged by the tub spout 20'.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above.

It is important to note that the construction and arrangement of the assembly as shown in the various exemplary embodiments is illustrative only. Additionally, any element disclosed in one embodiment may be incorporated or utilized with any other embodiment disclosed herein.

What is claimed is:

1. A tub and shower diverter assembly comprising:
an escutcheon;
a manifold sub-assembly fluidly coupled to an existing waterway connector of an existing tub and shower diverter system, the manifold sub-assembly comprising a mixing valve at least partially disposed through the escutcheon and coupled to the manifold sub-assembly by a valve nut, the manifold sub-assembly further comprising:
- a manifold including an inlet/outlet portion configured to be received in the existing waterway connector and an opening positioned opposite the inlet/outlet portion, the opening configured to receive the mixing valve therein;
- a first diverter valve housed in a first valve housing; and
- a second diverter valve housed in a second valve housing;
- wherein the first valve housing and the second valve housing are positioned opposite the inlet/outlet portion and next to the opening configured to receive the mixing valve.

2. The tub and shower diverter assembly of claim 1, wherein the inlet/outlet portion has a generally frustoconical shape that is complementary to a central opening of the waterway connector.

3. The tub and shower diverter assembly of claim 1, wherein the inlet/outlet portion comprises:
- at least one inlet port configured to be fluidly coupled to an inlet; and
- at least one outlet port configured to be fluidly coupled to an outlet.

4. The tub and shower diverter assembly of claim 1, wherein the manifold comprises one or more sealing members configured to sealingly engage the waterway connector so as to create a substantially watertight seal therebetween.

5. The tub and shower diverter assembly of claim 1, wherein the first valve housing defines a first opening for receiving at least a portion of the first diverter valve therein, and wherein the second valve housing defines a second opening for receiving at least a portion of the second diverter valve therein.

6. The tub and shower diverter assembly of claim 1, wherein the first diverter valve and the second diverter valve are configured to be push-button style on/off flow control valves.

7. The tub and shower diverter assembly of claim 1, wherein the diverter assembly is configured as a retrofit assembly.

8. A tub and shower diverter assembly comprising:
- an escutcheon;
- a manifold sub-assembly fluidly coupled to an existing waterway connector of an existing conventional tub and shower diverter system, the manifold sub-assembly further comprising:
  - a manifold including an inlet/outlet portion configured to be received in the existing waterway connector;
  - an opening positioned opposite the inlet/outlet portion, the opening configured to receive a mixing valve therein;
  - a first diverter valve housed in a first valve housing; and
  - a second diverter valve housed in a second valve housing;
    - wherein the first valve housing and the second valve housing are positioned opposite the inlet/outlet portion and next to the opening configured to receive the mixing valve.

9. The tub and shower diverter assembly of claim 8, wherein the inlet/outlet portion has a generally frustoconical shape that is complementary to a central opening of the waterway connector.

10. The tub and shower diverter assembly of claim 8, wherein the inlet/outlet portion comprises:
- at least one inlet port configured to be fluidly coupled to an inlet; and
- at least one outlet port configured to be fluidly coupled to an outlet.

11. The tub and shower diverter assembly of claim 8, wherein the manifold comprises one or more sealing members configured to sealingly engage the waterway connector so as to create a substantially watertight seal therebetween.

12. The tub and shower diverter assembly of claim 8, wherein the first valve housing defines a first opening for receiving at least a portion of the first diverter valve therein, and wherein the second valve housing defines a second opening for receiving at least a portion of the second diverter valve therein.

13. The tub and shower diverter assembly of claim 8, wherein the first diverter valve and the second diverter valve are configured to be push-button style on/off flow control valves.

14. The tub and shower diverter assembly of claim 8, wherein the diverter assembly is configured as a retrofit assembly.

15. A manifold sub-assembly for a tub and shower diverter system, the manifold sub-assembly comprising:
- a manifold including an inlet/outlet portion configured to be received in an existing waterway connector;
- an opening positioned opposite the inlet/outlet portion;
  - wherein the opening is configured to receive a mixing valve therein, the mixing valve being coupled to the opening by a valve nut,
- a first diverter valve housed in a first valve housing; and
- a second diverter valve housed in a second valve housing;
- wherein the manifold sub-assembly is detachably coupled to the existing waterway connector of an existing conventional tub and shower diverter system by one or more fasteners and is at least partially disposed through an escutcheon.

16. The manifold sub-assembly of claim 15, wherein the inlet/outlet portion comprises:
- at least one inlet port configured to be fluidly coupled to an inlet;
- at least one outlet port configured to be fluidly coupled to an outlet; and
- wherein the inlet/outlet portion has a generally frustoconical shape that is complementary to a central opening of the waterway connector.

17. The manifold sub-assembly of claim 15, wherein the manifold comprises one or more sealing members configured to sealingly engage the waterway connector so as to create a substantially watertight seal therebetween.

\* \* \* \* \*